Patented Nov. 12, 1929

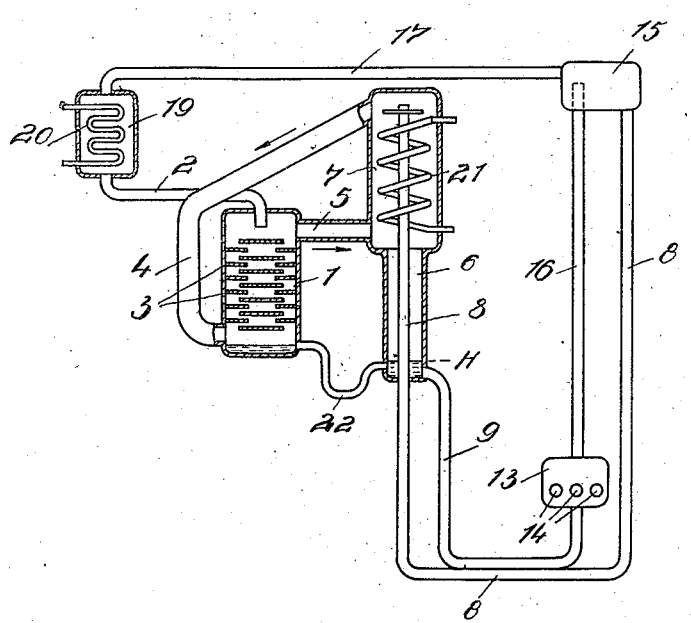

1,735,487

UNITED STATES PATENT OFFICE

EDMUND ALTENKIRCH, OF ALT-LANDSBERG-SUD, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

ABSORPTION MACHINE

Application filed October 17, 1927, Serial No. 226,767, and in Germany August 12, 1926.

My invention refers to absorption machines such as are used for refrigeration, in which two substances or groups of substances are in such relation to each other that heat is either liberated or absorbed. The invention more particularly refers to a machine in which a gaseous refrigerating agent has admixed to it both in the absorber and in the evaporator an inert, i. e. a non-absorbable gas.

The machines hitherto known which belong to this class, involve the drawback that the mixture of gases in the evaporator travels in downward direction, that is in the same direction as the condensate. Obviously in most cases a great advantage would be obtained in thermo-dynamical respect if the gas and the liquid travelled in counter-current.

This problem is solved according to the present invention by admixing to the gaseous refrigerant an inert gas of greater specific gravity than the refrigerant, the absorber and evaporator being disposed in such manner relative to each other that the range within which the lighter refrigerant is extracted by absorption from the mixture of gases, is situated at a higher level than the range within which the refrigerant is returned to the gas mixture in the evaporator.

Means are further provided for enabling such liquid, as remains over in the evaporator, to be carried away also.

In the drawings affixed to this specification and forming part thereof an absorption machine embodying my invention is illustrated diagrammatically by way of example.

Referring to the drawings, 1 is the evaporator in which refrigeration occurs by the evaporation of liquid refrigerant, such as for instance ammonia, which is supplied through tube 2 and on being distributed over the baffle plates 3 drips down in the evaporator, while the mixture of gases (such as for instance ammonia and air or ammonia and carbon dioxide) enters the evaporator from below through a tube 4 and travels upwards therein, at the same time carrying along the evaporating ammonia whereby its specific gravity is reduced. The mixture thus obtained rises through tube 5 into the absorber 7. In the absorber dilute absorption liquid supplied through tube 8 drips downwards, a cooling coil 21 being provided to withdraw the heat of absorption. The bottom portion of the absorber 7 is connected with a tube 6 of large diameter, and the concentrated absorption liquid formed as described is therefore prevented from collecting in the absorber and will drop and run down in the tube 6 collecting at its bottom. The quantity of absorption liquid provided in the machine is so chosen that the level of liquid H formed in the tube 6 is lower than the bottom of the absorber 1. While dripping down within the absorber 7 the solution absorbs a great part of the ammonia from the gas mixture, and this mixture therefore retains only a small quantity of ammonia and owing to its specific gravity being thus increased, travels downwardly again in the tube 4. The concentrated absorption solution which has collected in the bottom part of the tube 6, flows through pipe 9 to the boiler 13 which is here heated by means of heating resistances 14 which may, however, be replaced by any other source of heat. The supply of heat to the boiler causes the ammonia gas to be expelled from the solution and the gas now travels upwardly through pipe 16 and carries the absorption solution along with it into the gas separator 15 from which the dilute solution flows through the pipe 8 back to the absorber 7, while the expelled ammonia gas travels through pipe 17 into the condenser 19 to be there condensed, the heat of evaporation being abducted by the cooling coil 20. The condensate drains through pipe 2 into the evaporator 1 and the cycle of operations is thus closed.

It has proven to be inevitable that the ammonia gas escaping from the separator 15 carries along into the condenser 19 traces of the absorption liquid, which will then flow into the evaporator through pipe 2. As this liquid is not evaporated in the evaporator, it will gradually collect in the bottom part thereof, and if no provision is made for removing it, the liquid will gradually flood the bottom portion of the evaporator and will form an obstacle to the entrance of the gas mixture through tube 4. Apart therefrom these quantities of absorption liquid are now missing in the system formed by the boiler or expeller 13 and the absorber 7. In order to remedy this defect I connect the bottom part of the evaporator 1 with the tube 6 by a pipe 22 which is preferably bent into U-shape so as to form a liquid seal preventing the passage of gas.

The invention is particularly useful also in the case where the evaporator 1 is not supplied with liquid ammonia, but with an absorption solution, in which ammonia gas is dissolved and from which it is expelled by evaporation. The dilute absorption solution is again supplied with ammonia gas in a vessel corresponding to the condenser 19. As a rule the quantity of this absorption solution is also increased by part of the absorption solution from the system formed by the absorber and the boiler or expeller and therefore a tube corresponding to pipe 22 is required in this case also.

I wish it to be understood that I do not desire to be limited to the exact details of construction shown and described for obvious modifications will occur to a person skilled in the art.

I claim:—

1. In an absorption machine, a circulatory system comprising an absorber, an evaporator located at a lower level than the absorber, and conduit means connecting said absorber and evaporator, said system containing an absorbable gas and a non-absorbable gas of higher specific gravity than said absorbable gas.

2. In an absorption machine operating with an absorbable gas and a non-absorbable gas of higher specific gravity than the absorbable gas, an absorber, an evaporator located at a lower level than the absorber, and conduit means connecting said absorber and evaporator.

3. In an absorption machine operating with an absorption liquid, an absorbable gas and a non-absorbable gas of higher specific gravity than the absorbable gas, an absorber, an evaporator located at a lower level than the absorber, conduit means connecting said absorber and evaporator, and a collecting vessel connected to said absorber and being located below the lowermost level of said evaporator for collecting enriched absorption liquid below said lowermost level.

4. In an absorption machine operating with an absorption liquid, an absorbable gas and a non-absorbable gas of higher specific gravity than the absorbable gas, an absorber, an evaporator located at a lower level than the absorber, conduit means connecting said absorber and evaporator, a collecting vessel connected to said absorber and being located below the lowermost level of said evaporator for collecting enriched absorption liquid below said lowermost level, and a liquid drain connecting the lowermost evaporator level with said collecting vessel for draining the undesired amount of absorption liquid which may have passed into the evaporator.

5. Method of refrigeration which comprises liberating an absorbable gas from a liquid containing said gas by bringing said liquid into heat exchanging relation with a body to be cooled, conducting to the region of liberation from a higher level by gravity a non-absorbable gas of higher specific gravity than the absorbable gas, conducting the resulting mixture of absorbable and non-absorbable gases to the higher level under displacement by the down-flowing non-absorbable gas, and separating the absorbable gas from the non-absorbable gas at the higher level by absorption.

In testimony whereof I affix my signature.

EDMUND ALTENKIRCH.